Sept. 5, 1944.   H. H. DUERR ET AL   2,357,388
METHOD OF COLOR CORRECTION FOR MULTILAYER NEGATIVE FILM
Filed Nov. 6, 1942
Fig. 1,
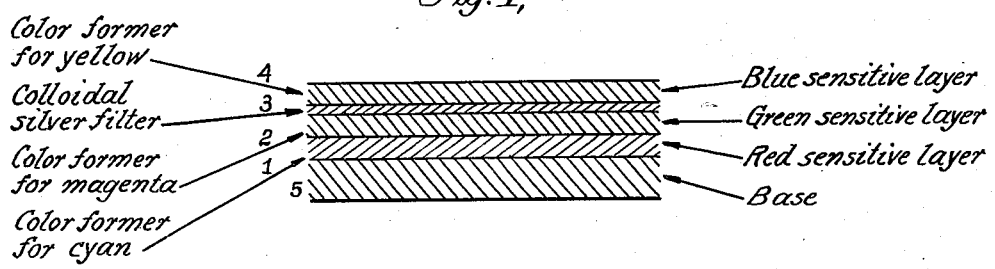
Fig. 2,
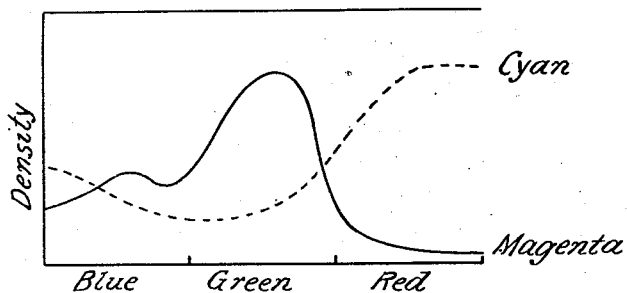
Fig. 3,
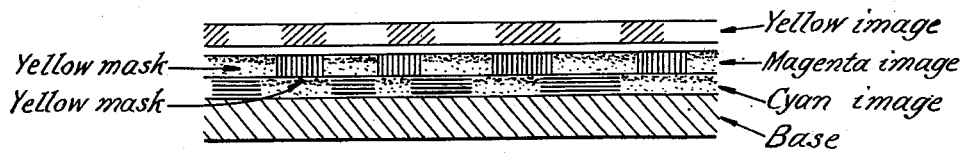
INVENTORS
Herman H. Duerr
Herbert W. Morreall, Jr.
BY Harold C. Harsh
Henry W. Coughlin
ATTORNEY Patented Sept. 5, 1944

2,357,388

UNITED STATES PATENT OFFICE 2,357,388

METHOD OF COLOR CORRECTION FOR MULTILAYER NEGATIVE FILM

Herman H. Duerr, Herbert W. Morreall, Jr., and Harold C. Harsh, Binghamton, N. Y.

Application November 6, 1942, Serial No. 464,716

14 Claims. (Cl. 95—2)

The present invention relates to color photography and particularly to color negatives containing masking images for color correction purposes, and to processes of producing said color negatives.

In the production of color prints of transparencies from natural order color negatives, the multi-layer color negative consists of yellow, magenta and cyan images in the different layers. The cyan image represents the red, the magenta image the green, and the yellow image the blue record of the original subject. Color positive prints or transparencies may be obtained from such color negatives by direct printing onto a multi-layer color positive film or paper or by making color separation negatives which are used for making color positive prints.

It is known that the colors, pigments or inks which are used in color photography for forming the transparent dye images are not ideal in their absorption characteristics for allowing color reproductions which are perfectly true in their color hues. Since it has not been possible to find dyes which have ideal absorption characteristics, numerous methods have been devised for making corrections in the imperfect absorption of said dyes. Generally it is a simple matter to find yellow dyes or pigments possessing acceptable absorption characteristics and requiring no correction in color printing processes. The same is not true, however, of the magenta and cyan dyes. The magenta dyes, in addition to their failure to absorb the green region completely, usually have a very undesirable absorption in the blue. The available cyan dyes are also imperfect in their absorption characteristics and generally show a considerable absorption in the blue and green regions. To compensate for these deficiencies in the absorption by the magenta and cyan dyes, it is necessary to apply color correction or so-called "masking methods" in order to obtain color prints with true tonal values.

One well-known method of obtaining such color correction consists in making a weak positive from one color record and superimposing this positive mask with a second color record when printing from the latter record. In this case, an additional film and printing operation are essential to provide the color correction mask. Furthermore, the problem of securing proper registration of the two images makes this method complicated, to say the least. It has also been proposed to incorporate in a multi-layer film containing color-forming components, a separate emulsion layer and to convert this separate layer by special and complicated processing steps into a masking layer. The complexity and difficulties attendant upon such procedures speak for themselves.

We have now found that the difficulties and disadvantages attendant upon the use of known processes and known color negatives containing printing masses can be completely obviated by producing only in the cyan and magenta layers of negative subtractively colored multi-layer film, reversed rest or stained images and utilizing these images as masks in printing to compensate for the incorrect color absorption of the cyan and magenta dyes. The production of such images and the negatives containing the same constitute the purposes and objects of our invention.

The invention will be more readily understood when read with the accompanying drawing, Figure 1 of which discloses in section the original multi-layer material, Figure 2 of which discloses typical absorption curves of cyan and magenta dyes, and Figure 3 of which discloses the negative material containing the masking images.

Referring to the drawing and particularly to Figure 1 thereof, it will be seen that the original material comprises a base, 5, upon which are superimposed three silver halide emulsion layers, one of which, indicated by reference numeral 1, is red-sensitive; another of which, indicated by reference numeral 2, is green-sensitive, and a third of which, indicated by reference numeral 4, is blue-sensitive. The dyes utilized for sensitizing layers 1 and 2 are of the usual type and need not possess the ability of withstanding the oxidizing action of silver-bleaching baths. Interposed between layers 2 and 4 is a layer, 3, of gelatin containing a yellow filter dyestuff or preferably a yellow colloidal silver layer acting as a filter. Suitable yellow dyestuffs are, for instance, the condensation products disclosed in U. S. P. 2,186,731, for example, the condensation product of 2,3-dimethyl-benzthiazole-methyl sulfate with p-amino-benzaldehyde, which is in turn reacted with undecyl chloride. Suitable colloidal silver filter layers are disclosed in U. S. P. 2,220,187.

The red-sensitive layer, 1, contains a color-coupling component capable of being developed to a cyan dye image with a color developer comprising an aromatic amino developing agent such as diethyl-para-phenylene-diamine. We have found that suitable cyan dye images may be produced from the color components disclosed in U. S. P. 2,179,238, 2,186,733 and 2,224,329.

Specific examples of such color formers are, for instance, 3.5-di(phenylamino)-phenol, abietyl-amino-naphthol, 1-N-stearyl-4-N(1-hydroxy-2'-naphthoyl)-phenylene-diamine sodium sulfonate and the like. The green-sensitive layer, 2, contains a color-coupling component capable of forming a megenta dye with a suitable color developer. Satisfactory color components for the magenta image are the nondiffusing components described in U. S. patents, 2,178,612 and 2,179,238. Example of such components are the condensation product of meta-amino-phenyl-methyl-pyrazolone and the mixed polymer of vinyl chloride and maleic acid anhydride, para-(hydroxynaphthoyl-amino)-1-phenyl-3-methyl-5-pyrazolone, and the like. The blue-sensitive layer, 4, contains a color coupling component capable of forming a yellow dye image with a color developer. Satisfactory components for this layer are the nondiffusing yellow color components described in U. S. patents, 2,179,238 and 2,224,329. Examples of such color components are terephthaloyl-bis-acetic acid anilide-p'-carboxylic acid, and the like.

The original film constituted as above described is exposed to a colored object and then developed in a color developer, for which purpose we prefer to use diethyl-para-phenylenediamine. A suitable developer comprises the following composition:

Diethyl-para-phenylene-diamine ___grams__ 2
Calcined sodium carbonate_____do____ 6
Water—to make_____cc__ 200

This development results in the formation of negative silver and color images at the exposed portions of the multi-layer film. The material is then rinsed in water and, without bleaching the negative silver, is subjected to a re-exposure so as to expose only layers 1 and 2. Thus in the event that the yellow filter in layer 3 has been destroyed or washed out in the color-developing bath, the re-exposure is effected with yellow light. If, on the other hand, the yellow filter has not been destroyed by the first development, the re-exposure may be effected through the base with white light or from either side with minus-blue light. The second exposure produces a latent image in the remaining silver halide of layers 1 and 2. These layers are then developed with a special developer which must have the characteristics that it does not form dyestuff images with the color formers in the layers but does form, in addition to the regular silver images, yellow or brownish-yellow stain images. Images of this type have been generally referred to as "rest" images (see Photographische Industrie, 1932, page 1205). These developers have the property that the oxidation products thereof instead of coupling with the color-coupling components in the layers, precipitate in situ on the gelatin, presumably because of their tanning action on the gelatin. It is this precipitation of the oxidation products on the gelatin which leads to the formation of the rest images of low contrast. Suitable developers possessing these prerequisites are those of the di-hydroxy and tri-hydroxy benzene group, such as catechol, hydroquinone, adurol, pyrogallol and the like. Of these, best results are obtained by the utilization of pyrogallol, which gives bright yellow masking images, and we accordingly prefer to employ this developer. A satisfactory developing formula involving the use of pyrogallol is the following:

Solution A

Sodium bisulfite_____grams__ 5
Pyrogallol _____do____ 30
Potassium bromide_____do____ .6
Water—to _____cc__ 500

Solution B

Sodium sulfite_____grams__ 10
Sodium carbonate (monohydride)____do____ 30
Water—to _____cc__ 500

For use: 1 part of Solution A is added to 1 part of Solution B along with 8 parts of water. The development is effected for 7 minutes at about 68° F.

During this development there are produced in the cyan and magenta layers, positive silver images plus the yellow to brownish-yellow rest or stain images. No rest images are formed in layer 4, since the residual silver halide of this image was not re-exposed during the second exposure. After a short rinse, the material is processed to remove the positive and negative silver by subjecting the material to the action of a suitable silver bleaching bath such as, for example, Farmer's reducer. The remaining silver halide is then fixed in a fixing bath which will not injure the subtractively colored images and the rest or stain images. For this purpose, a fixing bath of the following formula has been found to be satisfactory:

Sodium thiosulfate (.5H$_2$O)_____grams__ 20
Water—to make_____cc__ 100

The material is then washed and after drying is ready for corrected color printing on multi-layer color positive paper, film, or for other color printing or duplicating purposes. The finished color negative film obtained will then have the appearance of that illustrated by Figure 3.

Instead of working up the color-developed film in the manner outlined above, the film may be processed to produce the dye and rest images in the following manner. The film containing negative silver and color-developed images is submitted to the action of a controlled fixing bath comprising the usual fixing bath containing a high alcohol, such as propanol, butanol, amyl alcohol, and the like, in a quantity of 20 parts by weight. The film is permitted to remain in the controlled fixing bath for a period of approximately 1 minute, whereupon it will be found that a very clear-cut fixing of the silver halide of the blue-sensitive layer alone is effected. We have found that by this controlled fixing, the fixation of the silver halide of the blue-sensitive layer is effected with a loss of less than ten per cent of the silver halide in the green-sensitive layer. The controlled fixing may be accomplished in white light, as a consequence of which the silver halide of the green- and blue-sensitive layers is re-exposed. Should such exposure be insufficient, however, the film after the controlled fixing is exposed to white light and then developed in a staining developer and further processed in the manner outlined above.

The yellow to brownish-yellow positive rest images obtained in the green- and red-sensitive layers are of relatively low contrast, absorbing blue, and are for this reason ideally suited for color correction purposes, as is evident from Figure 2 of the drawing. In this figure the absorption curves of typical cyan and magenta dyes obtained by color forming development are demonstrated. It will be seen that the absorption maximum of the magenta dyes in the blue region is very undesirable and any suitable masking method should eliminate this degrading blue absorption. This is accomplished by the yellow to brownish-yellow masking images produced as herein described.

The masking layers in the green- and red-sensitive layers have very little effect on the color contrast of these two layers. The contrast of the yellow image naturally becomes somewhat flatter. However, any objection on this score can be compensated for by initially providing the blue-sensitive layer with a slightly steeper gradation.

We claim:

1. In the production of subtractively colored negatives with correction printing masks for multi-layer film having silver halide emulsions containing color formers and being respectively sensitized to the blue, green and red regions of the spectrum, by exposing said multi-layer film to a colored object and color developing the same, the improvement which comprises re-exposing at least one of the green- and red-sensitive layers of said film and developing the same in a developer incapable of coupling with the color formers in the layer, but capable of producing silver and stained images of a yellow to brownish-yellow color.

2. In the production of subtractively colored negative with correction printing masks from multi-layer film comprising a base carrying superimposed emulsion layers containing color formers and sensitized respectively to red, green and blue, by exposing said multi-layer film to a colored object and color-developing the same, the improvement which comprises re-exposing only the green- and red-sensitive layers of said film and developing the same in a developer incapable of coupling with the color formers in the layer, but capable of producing silver and stained images of a yellow to brownish-yellow color.

3. The process as defined in claim 1 wherein the re-exposure is effected prior to the removal of the negative silver.

4. The process as defined in claim 1 wherein the re-exposure is effected prior to the removal of the negative silver and wherein the negative and positive silver is removed in toto after the final development step.

5. The process as defined in claim 1 wherein said multi-layer film comprises a base carrying superimposed emulsion layers sensitized respectively to red, green and blue, the red-sensitive layer containing a nondiffusing dyestuff component for cyan, the green-sensitive layer containing a nondiffusing color component for magenta, and the blue-sensitive layer containing a nondiffusing color component for yellow, the blue- and green-sensitive layers being separated by a yellow filter layer.

6. The process as defined in claim 1 wherein the development of the re-exposed material is effected with a polyhydroxybenzene.

7. The process as defined in claim 1 wherein the development of the re-exposed material is effected with pyrogallol.

8. Substractively colored multi-layer transparent negatives suitable for printing and containing in at least one of the cyan and magenta layers, correction masks comprising positive rest or stained images of a yellowish to brownish-yellow color.

9. Subtractively colored multi-layer transparent negatives suitable for printing and containing in the cyan and magenta layers only, correction masks comprising positive rest or stained images of a yellow to brownish-yellow color.

10. The article comprising a base having three layers containing respectively, transparent cyan negative images, transparent magenta images, and transparent yellow images, and in the cyan and magenta image layers, positive rest or stained images of a yellowish to brownish-yellow color.

11. The article as defined in claim 8 wherein said rest or stained image of a yellowish to brownish-yellow color is constituted by the oxidation products of a polyhydroxybenzene.

12. The article as defined in claim 8 wherein said positive rest or stained images of a yellowish to brownish-yellow color are constituted by the oxidation products of pyrogallol.

13. The article as defined in claim 9 wherein said rest or stained images of a yellowish to brownish-yellow color are constituted by the oxidation products of a polyhydroxybenzene.

14. The article as defined in claim 9 wherein said positive rest or stained images of a yellowish to brownish-yellow color are constituted by the oxidation products of pyrogallol.

HERMAN H. DUERR.
HERBERT W. MORREALL, Jr.
HAROLD C. HARSH.